(12) United States Patent
Ueno et al.

(10) Patent No.: US 10,509,343 B2
(45) Date of Patent: Dec. 17, 2019

(54) BELT DRIVING DEVICE AND IMAGE FORMING APPARATUS

(71) Applicant: KYOCERA Document Solutions Inc., Osaka-shi, Osaka (JP)

(72) Inventors: Masahiro Ueno, Osaka (JP); Tomohiko Yamakawa, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/277,791

(22) Filed: Feb. 15, 2019

(65) Prior Publication Data
US 2019/0258195 A1    Aug. 22, 2019

(30) Foreign Application Priority Data

Feb. 19, 2018   (JP) ................................. 2018-026679

(51) Int. Cl.
*G03G 15/16*     (2006.01)
*B65G 39/071*    (2006.01)

(52) U.S. Cl.
CPC ....... *G03G 15/1615* (2013.01); *B65G 39/071* (2013.01); *G03G 2215/00143* (2013.01)

(58) Field of Classification Search
CPC .......... G03G 15/0189; G03G 15/1615; G03G 15/2053; G03G 15/755; G03G 2215/00143; G03G 2215/00151; G03G 2215/0122; G03G 2215/1623; G03G 2215/2016; G03G 2215/2009; B65G 23/04; B65G 39/071; B65G 39/16; B65G 2812/02168; F16H 7/14; F16H 9/125

USPC .............. 399/165, 303, 308, 312, 313, 329; 198/840; 474/122, 123
See application file for complete search history.

(56) References Cited

U.S. PATENT DOCUMENTS

| 5,316,524 A | * | 5/1994 | Wong ................... G03G 15/755 |
| | | | 474/107 |
| 2003/0175056 A1 | * | 9/2003 | Sato .................... G03G 15/1615 |
| | | | 399/302 |

(Continued)

FOREIGN PATENT DOCUMENTS

| JP | 10186888 A | * | 7/1998 |
| JP | 11091977 A | * | 4/1999 |

(Continued)

*Primary Examiner* — Robert B Beatty
(74) *Attorney, Agent, or Firm* — Alleman Hall Creaseman & Tuttle LLP

(57) ABSTRACT

A belt driving device includes a plurality of rollers, an endless belt, a contact surface, and a non-contact surface. The rollers include a driving roller that is rotationally driven. The endless belt is stretched between the rollers such that a predetermined tension is applied to the endless belt, and the endless belt protrudes from opposite end portions of the rollers in an axis direction of each of the rollers. The contact surface is formed at a first end portion of at least one of the rollers and comes in contact with the endless belt. The first end portion is located on a meandering direction side of the endless belt. The non-contact surface is formed at each of second end portions of the rollers and doesn't come in contact with the endless belt. The second end portions are located on a side opposite to the meandering direction of the endless belt.

12 Claims, 7 Drawing Sheets

(56) References Cited

U.S. PATENT DOCUMENTS

2011/0274472 A1* 11/2011 Inaba ................. G03G 15/1615
                                                                               399/302
2016/0313677 A1* 10/2016 Oyama .............. G03G 15/1615
2017/0097592 A1* 4/2017 Furukawa .......... G03G 15/1615

FOREIGN PATENT DOCUMENTS

JP          2001255778 A  *  9/2001
JP          2006337814 A    12/2006

* cited by examiner

BELT DRIVING DEVICE AND IMAGE FORMING APPARATUS

INCORPORATION BY REFERENCE

This application is based upon and claims the benefit of priority from the corresponding Japanese Patent Application No. 2018-026679 filed on Feb. 19, 2018, the entire contents of which are incorporated herein by reference.

BACKGROUND

The present disclosure relates to a belt driving device provided in an image forming apparatus such as a copier, a printer, or a multifunction peripheral having functions of these, and relates to an image forming apparatus including a belt driving device.

In an electrophotographic image forming apparatus, first, toner is supplied to a photoconductor (image carrier) so that the toner is adhered to an electrostatic latent image formed on the photoconductor. A transfer portion then transfers the toner adhered to the photoconductor to a sheet (paper sheet), and a fixing portion fixes the toner to the sheet, thereby an image is formed on the sheet.

SUMMARY

A belt driving device according to an aspect of the present disclosure includes a plurality of rollers, an endless belt, a contact surface, and a non-contact surface. The plurality of rollers include a driving roller that is rotationally driven. The endless belt is stretched between the plurality of rollers such that a predetermined tension is applied to the endless belt, and the endless belt protrudes from opposite end portions of the plurality of rollers in an axis direction of each of the plurality of rollers. The contact surface is formed at a first end portion of at least one roller of the plurality of rollers and comes in contact with the endless belt, the first end portion being located on a meandering direction side of the endless belt. The non-contact surface is formed at each of second end portions of the plurality of rollers and does not come in contact with the endless belt, the second end portions being located on a side opposite to the meandering direction of the endless belt.

An image forming apparatus according to another aspect of the present disclosure includes the belt driving device and a transfer portion that transfers a toner image formed on a photoconductor to the endless belt, or to a sheet conveyed by the endless belt.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

An image forming apparatus according to the present disclosure is, for example, a multifunction peripheral having a plurality of functions such as a print function, a copy function, a facsimile function, and a scanner function. It is noted that the image forming apparatus according to the present disclosure is applicable to a printer apparatus, a copier, a facsimile apparatus, and a scanner apparatus. In the following, an image forming apparatus that executes a print process to form an image on a sheet (sheet of paper), is described as an example of the image forming apparatus according to the present disclosure.

Figure 1:
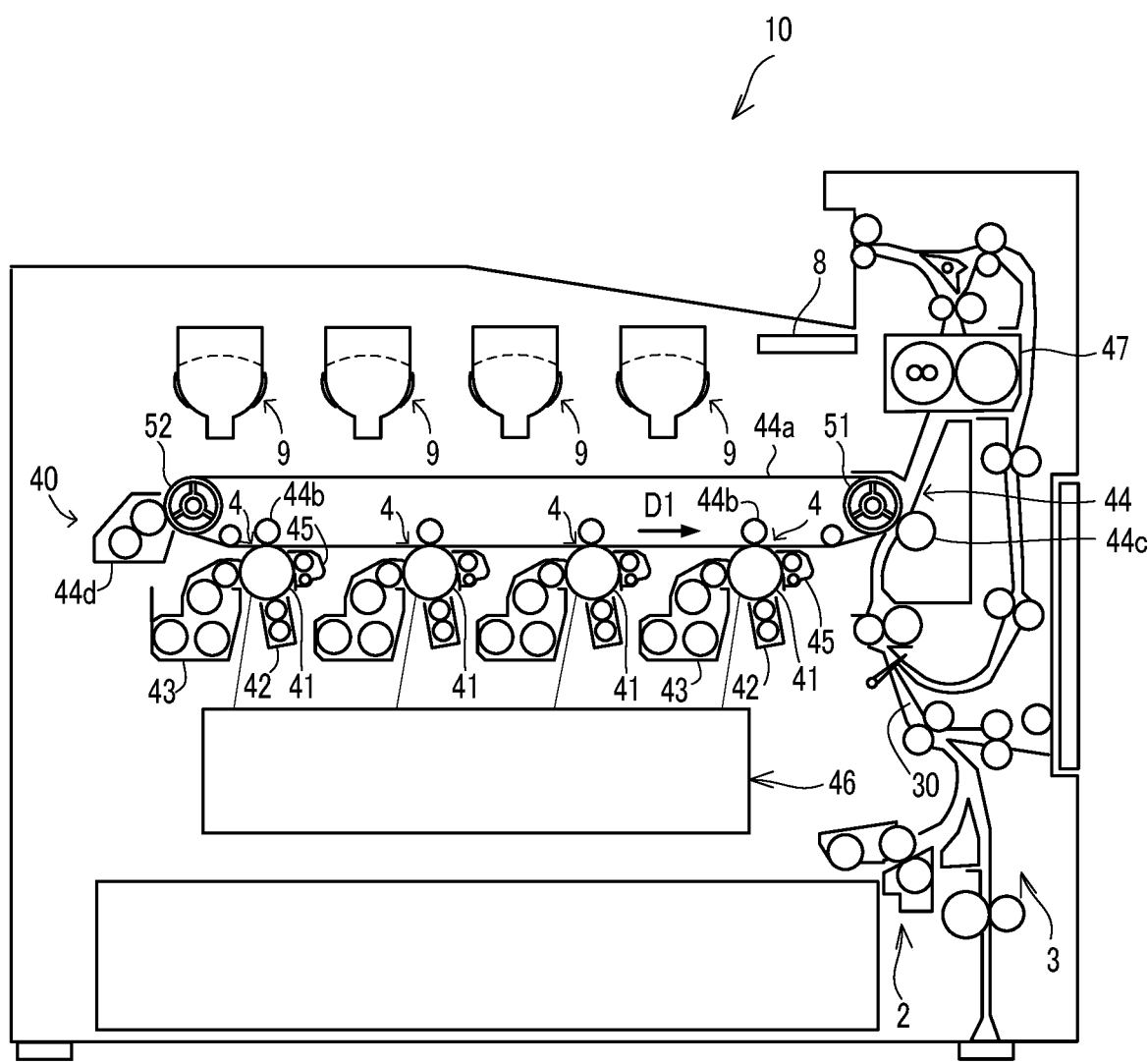
FIG. 1 is a diagram showing a schematic configuration of an image forming apparatus according to an embodiment of the present disclosure.

As shown in FIG. 1, an image forming apparatus 10 includes a sheet supply portion 2, a sheet conveying portion 3, an image forming portion 40, and a control portion 8.

The image forming portion 40 executes the print process by an electrophotographic system. As a result, the image forming portion 40 includes an image creating portion(s) 4, a laser scanning portion 46 (an exposure portion), a transfer portion 44, and a fixing portion 47. The image creating portion(s) 4 includes a photoconductor 41 (image carrier), a charging portion 42, a developing portion 43, and a photoconductor cleaning portion 45.

As shown in FIG. 1, the image forming apparatus 10 is a color image forming apparatus including the image forming portion 40 of tandem type. As a result, the image forming apparatus 10 includes four image creating portions 4 respectively corresponding to four colors (cyan, magenta, yellow, and black) of toner 9.

The transfer portion 44 includes an intermediate transfer belt 44a, four primary transfer portions 44b respectively corresponding to the four image creating portions 4, a secondary transfer portion 44c (also referred to as an intermediate transfer portion), and a belt cleaning portion 44d.

The sheet supply portion 2 feeds a sheet to a conveyance path 30. The sheet conveying portion 3 conveys the sheet along the conveyance path 30.

The intermediate transfer belt 44a and four cylindrical photoconductors 41 of the image creating portions 4 are rotationally driven by a motor (not shown). The charging portion 42 charges the surface of the photoconductor 41 uniformly. The laser scanning portion 46 writes an electrostatic latent image on the surface of the photoconductor 41.

The developing portion 43 develops, with the toner 9, the electrostatic latent image on the surface of the photoconductor 41. This allows an image of the toner 9 to be formed on the surface of the photoconductor 41.

Each of the primary transfer portions 44b (hereinafter also referred to as "primary transfer rollers") transfers the image of the toner 9 from the surface of a corresponding photoconductor 41 to the intermediate transfer belt 44a. Specifically, the primary transfer rollers 44b are disposed to be in contact with the intermediate transfer belt 44a at positions respectively facing the photoconductors 41 across the intermediate transfer belt 44a. The primary transfer rollers 44b are configured to move in an up-down direction in FIG. 1 so as to press the photoconductors 41 via the intermediate transfer belt 44a to form primary transfer nip portions, and be separated from the intermediate transfer belt 44a again, as necessary.

At the primary transfer nip portions, the toner images formed on the photoconductors 41 are transferred onto the surface of the intermediate transfer belt 44a. Then as the intermediate transfer belt 44a rotates, the toner images are transferred one by one from the photoconductors 41 to the surface of the intermediate transfer belt 44a at predetermined timings. This allows the toner images of the four colors (cyan, magenta, yellow, and black) to be overlaid with each other to form a full-color toner image on the surface of the intermediate transfer belt 44a. The photoconductor cleaning portions 45 remove residual toner 9 from the surfaces of corresponding photoconductors 41.

The intermediate transfer belt 44a is an endless (annular) belt member (endless belt), and is stretched between a driving roller 51 and a driven roller 52. A predetermined tension is applied to the intermediate transfer belt 44a by the driving roller 51 and the driven roller 52. The driving roller 51 rotates upon receiving a rotational driving force supplied from the motor (not shown). This allows the intermediate transfer belt 44a to rotate in a rotation direction D1 shown in FIG. 1.

The secondary transfer portion 44c (hereinafter also referred to as a "secondary transfer roller") transfers the color toner image of the toner 9 from the intermediate transfer belt 44a to the sheet conveyed along the conveyance path 30. Specifically, the secondary transfer roller 44c is disposed to face the driving roller 51 across the intermediate transfer belt 44a, and presses the intermediate transfer belt 44a to form a secondary transfer nip portion. At the secondary transfer nip portion, the secondary transfer roller 44c transfers the color toner image of the toner 9 from the surface of the intermediate transfer belt 44a to the sheet.

The fixing portion 47 fixes the color toner image of the toner 9 to the sheet by heating the color toner image of the toner 9 transferred to the sheet. The belt cleaning portion 44d removes residual toner 9 from the surface of the intermediate transfer belt 44a.

The control portion 8 includes a CPU, a nonvolatile memory, a RAM and the like. It is noted that the control portion 8 may be an electronic circuit such as an ASIC (Application Specific Integrated Circuit) or a DSP (Digital Signal Processor). The CPU executes a program that is stored in the nonvolatile memory in advance, using the RAM as a work area. This allows the CPU to comprehensively control the image forming apparatus 10 during an image forming process performed by the image forming apparatus 10.

Meanwhile, there is a problem with image forming apparatuses that an endless belt such as a sheet conveyance belt or intermediate transfer belt meanders. The meandering is a phenomenon where, for example, an endless belt stretched between a driving roller and a driven roller gradually moves in a width direction of the sheet (a main scanning direction) as the driving roller and the driven roller repeat the rotations. To prevent the meandering, for example, guide ribs may be provided at opposite ends of the intermediate transfer belt. However, such a configuration would make the configuration of the intermediate transfer belt complex, and increase the cost. On the other hand, a belt driving device 1 and the image forming apparatus 10 of the present embodiment can prevent the meandering of the endless belt with a simple configuration.

The belt driving device of the present disclosure includes, for example, the driving roller 51, the driven roller 52, and the intermediate transfer belt 44a. It is noted that the belt driving device of the present disclosure may be applied to an image forming apparatus of a direct transfer system in which toner images formed on the photoconductors 41 are directly transferred to the sheet. In that case, the belt driving device 1 may include a conveyance belt for conveying a sheet, and a driving roller and a driven roller for rotationally conveying the conveyance belt.

In the following, the belt driving device of the present disclosure is described in detail. It is noted that in the following, an endless belt refers to a rotary belt that is applicable to various purposes such as an intermediate transfer belt and a sheet conveyance belt. Similarly, a driving roller and a driven roller refer to rollers that rotationally convey the endless belt.

Figure 2:
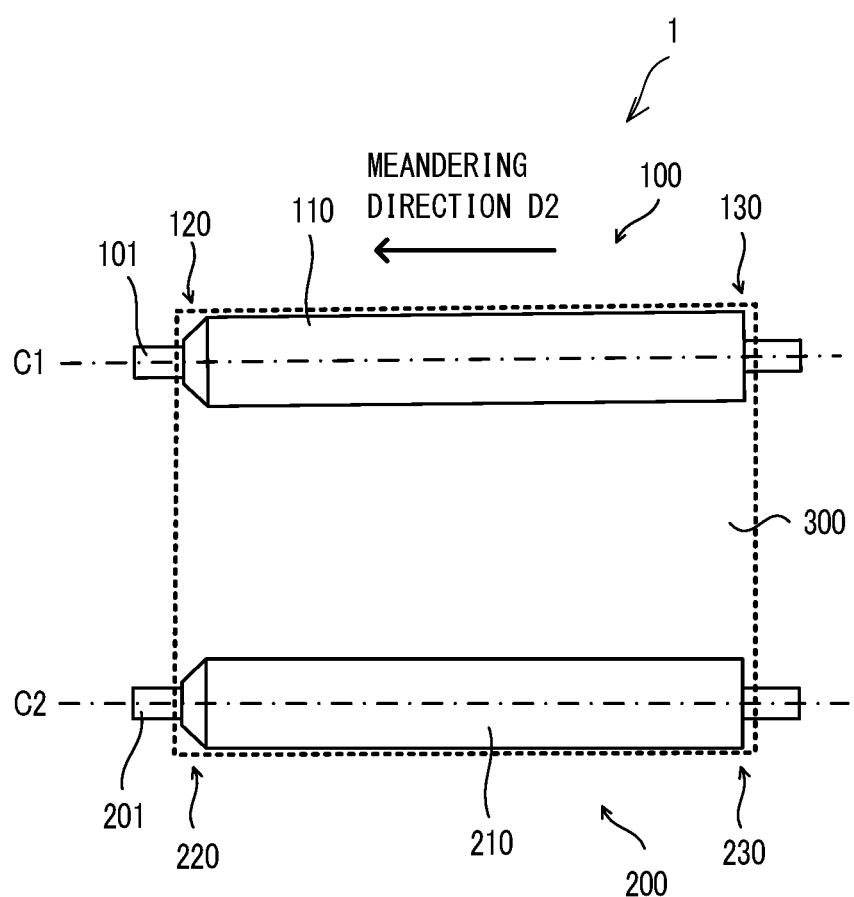
FIG. 2 is a diagram showing a belt driving device according to the embodiment of the present disclosure.

As shown in FIG. 2, the belt driving device 1 according to the present embodiment includes a driving roller 100, a driven roller 200, and an endless belt 300. FIG. 2 is a plan view of the belt driving device 1. The belt driving device 1 may include a roller(s) other than the driving roller 100 and the driven roller 200.

The endless belt 300 may be: a resin belt made of a single layer composed of only an unstretchable resin layer; or an elastic belt composed of a plurality of layers including an elastic layer and a base layer, wherein the front surface of the elastic belt is formed from the elastic layer made of an elastic material such as rubber, and the rear surface of the elastic belt is formed from the base layer made of an unstretchable resin material. The endless belt 300 is stretched between the driving roller 100 and the driven roller 200 such that a predetermined tension is applied to the endless belt 300. In addition, the endless belt 300 is larger in width than the driving roller 100 and the driven roller 200. As a result, end portions of the endless belt 300 protrude from end portions of the driving roller 100 and the driven roller 200.

Alignment of the driving roller 100 and the driven roller 200 is adjusted in advance such that the endless belt 300 meanders in a predetermined direction (a meandering direction D2 shown in FIG. 2) by rotation operation of the driving roller 100 and the driven roller 200. For example, alignment adjustment is performed such that a shaft core C1 of a roller shaft 101 of the driving roller 100 and a shaft core C2 of a roller shaft 201 of the driven roller 200 are not parallel to each other. This allows the endless belt 300 to meander in the predetermined direction (the meandering direction D2) by the rotation operation of the driving roller 100 and the driven roller 200 and not to move in the opposite direction.

Figure 3:
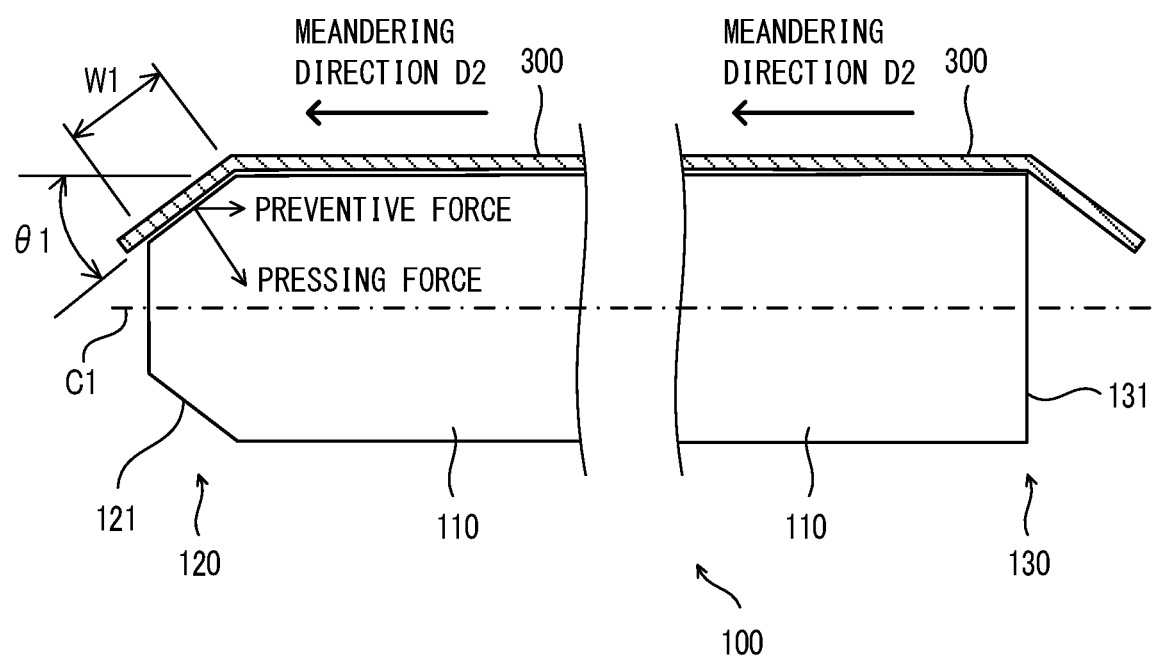
FIG. 3 is an enlarged diagram showing a configuration of roller end portions in the belt driving device according to the embodiment of the present disclosure.

FIG. 3 is an enlarged diagram showing end portions of the driving roller 100. It is noted that FIG. 3 shows a cross-section of the driving roller 100 cut at its center. An inclined surface 121 (contact surface) is formed at a first end portion 120 (for example, a left end portion) of the driving roller 100, the first end portion 120 being located on a meandering direction D2 side.

The first end portion 120 of the driving roller 100 includes the inclined surface 121 that is inclined from the perimeter surface of a barrel portion 110 of the driving roller 100 toward the shaft core C1 at an angle θ1, and has a width W1 extending in the inclination direction. In other words, the first end portion 120 has the inclined surface 121 along which the roller diameter gradually decreases in the meandering direction D2. It is noted that the angle θ1 is an angle of the inclined surface 121 to the roller shaft (the shaft core C1) of the driving roller 100.

On the other hand, a second end portion 130 (for example, a right end portion) of the driving roller 100 that is located on an opposite side to the meandering direction D2, does not have an inclined surface (contact surface), but has a right-angle surface 131 (non-contact surface).

According to the above-mentioned configuration, an end portion (left end portion) of the endless belt 300 is covering and in contact with the inclined surface 121 of the first end portion 120. Here, in a state where the endless belt 300 is stretched between the driving roller 100 and the driven roller 200, with a predetermined tension being applied to the endless belt 300, a force (pressing force) is applied to the inclined surface 121 in a direction indicated by the arrow in FIG. 3. This allows a component force in a shaft core C1 direction, resolved from the pressing force, to act as a force (preventive force) against a force in the meandering direction D2 (meandering force). This makes it possible to prevent the meandering of the endless belt 300.

That is, when the endless belt 300 meanders, the endless belt 300 first moves in a predetermined direction (the meandering direction D2), but due to the action of the preventive force, the endless belt 300 stops at a predetermined position, and does not move further in the meandering direction D2.

As described above, the inclined surface 121 of the first end portion 120 has a function to resolve a force (pressing force) applied to the inclined surface 121 by the endless belt 300, into component forces including a component force in an opposite direction of the meandering direction D2. It is noted that when the endless belt 300 is the elastic belt, the endless belt 300 can deform along the shape of the rollers on which it is stretched, and thus the preventive force is stably exerted.

Here, the larger the contact area of the endless belt 300 with the inclined surface 121 of the first end portion 120 is, the larger the pressing force and the preventive force are. In addition, when the angle θ1 is excessively large, the end portion of the endless belt 300 floats from the inclined surface of the first end portion 120, and the contact area becomes small. As a result, the angle θ1 is preferably smaller than a predetermined angle θ0. The predetermined angle θ0 is set appropriately based on the material and thickness of the endless belt 300, the amount of protrusion of the endless belt 300 from the barrel portion 110 of the driving roller 100, and the like.

In addition, the larger the width W1 of the inclined surface 121 is, the larger the contact area of the endless belt 300 with the inclined surface 121 of the first end portion 120 is, and the larger the preventive force is. As a result, with regard to the inclined surface 121, it is preferable that the angle θ1 is smaller than the predetermined angle θ0, and the width W1 is large.

Meanwhile, if the second end portion 130 of the driving roller 100, like the first end portion 120, had an inclined surface that would come in contact with the other end portion of the endless belt 300, a component force of the pressing force in the shaft core C1 direction would act as a propulsion force that propels the meandering since the direction of the component force is the same as the meandering direction D2.

As a result, an end portion (the right end portion) of the endless belt 300 that is located on an opposite side to the meandering direction D2, preferably does not come in contact with the second end portion 130. In this respect, in the belt driving device 1 of the present embodiment, the second end portion 130 of the driving roller 100 does not have an inclined surface, but has the right-angle surface 131. As a result, the right end portion of the endless belt 300 does not come in contact with the second end portion 130, and the second end portion 130 of the driving roller 100 does not contribute to movement of the endless belt 300 in the meandering direction D2. It is therefore possible to prevent meandering of the endless belt 300.

Figure 4:
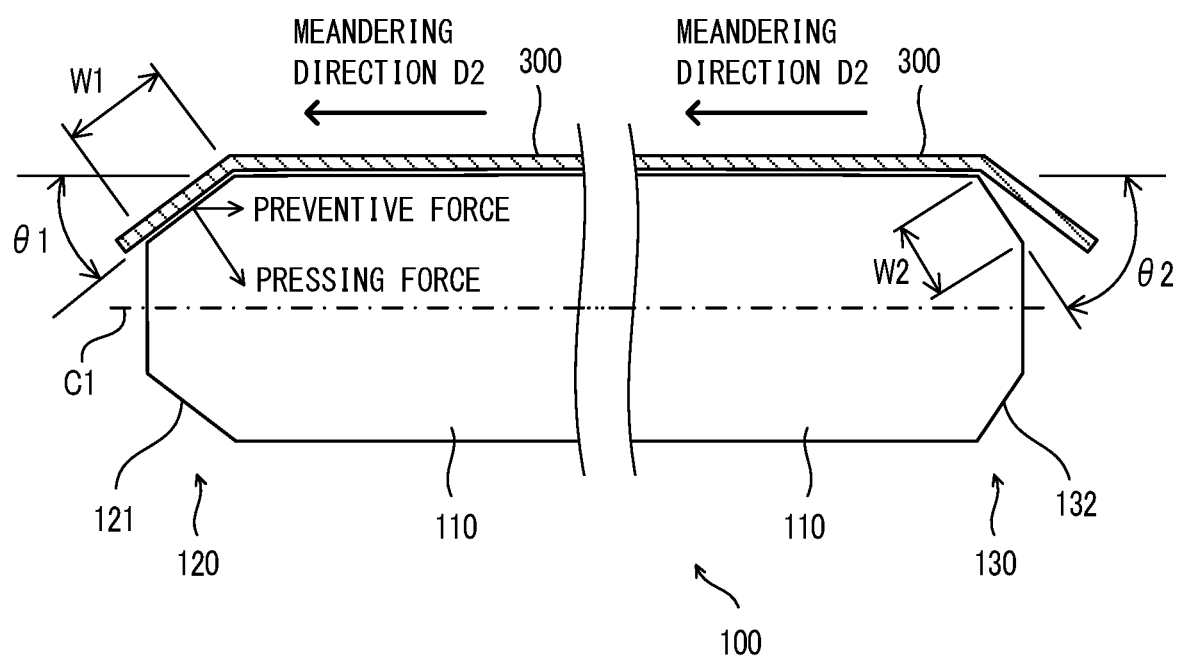
FIG. 4 is an enlarged diagram showing another configuration of the roller end portions in the belt driving device according to the embodiment of the present disclosure.

It is noted that, as shown in FIG. 4, the second end portion 130 may include an inclined surface 132 (non-contact surface) on the condition that it does not come in contact with the endless belt 300. In this case, the condition is that at least the angle θ2 is larger than the angle θ1 (θ1<θ2). That is, the second end portion 130 may include the inclined surface 132 whose angle is larger than an angle of the inclined surface 121 of the first end portion 120 against the roller shaft (the shaft core C1). It is noted that in a case where opposite end portions of the endless belt 300 come in contact with the first end portion 120 and the second end portion 130 respectively (for example, when θ1=θ2), a width W2 of an inclined surface of the second end portion 130 is preferably smaller than the width W1 (W2<W1).

Figure 5:
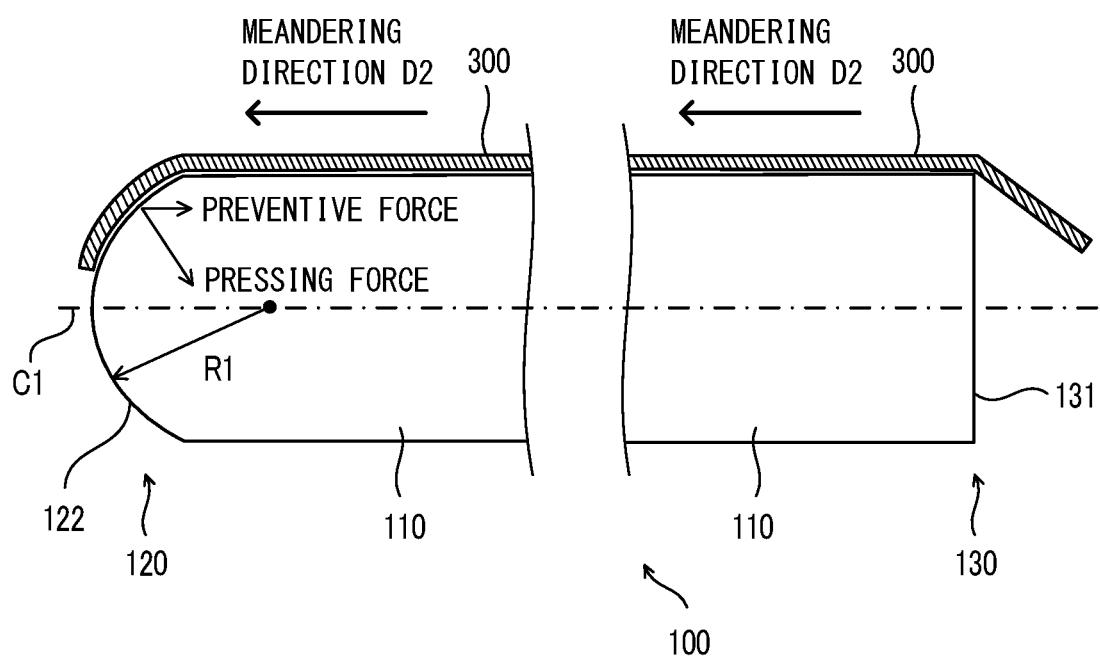
FIG. 5 is an enlarged diagram showing another configuration of the roller end portions in the belt driving device according to the embodiment of the present disclosure.

The shape of the first end portion 120 is not limited to the inclined surface. For example, as shown in FIG. 5, the first end portion 120 may include a curved surface that is curved in the meandering direction D2. For example, the first end portion 120 may include a curved surface 122 (contact surface) of a radius R1 around a predetermined position on the shaft core C1. It is noted that the curved surface 122 may be elliptic.

According to the configuration shown in FIG. 5, the contact area of the endless belt 300 with the first end portion 120 is larger than that of the configuration described above. This allows the preventive force to be larger, and makes it possible to prevent the endless belt 300 from meandering more.

Figure 6:
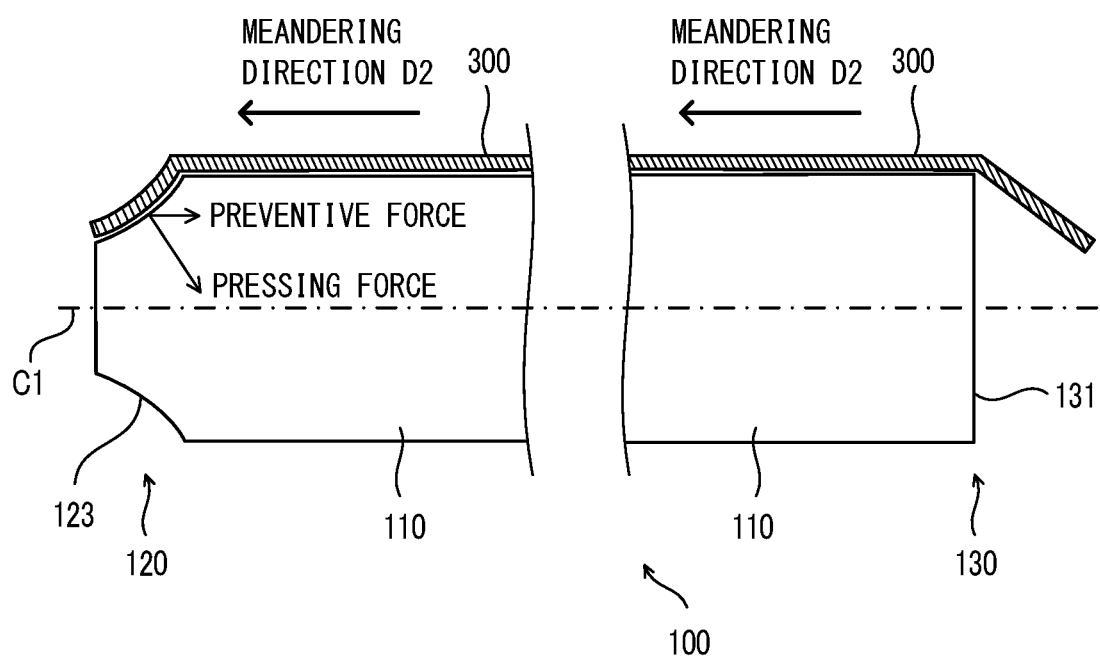
FIG. 6 is an enlarged diagram showing another configuration of the roller end portions in the belt driving device according to the embodiment of the present disclosure.

In addition, as shown in FIG. 6, the first end portion 120 may have a concave curved surface 123 (contact surface) that is curved in the shaft core C1 direction. The concave curved surface 123 may be a curved surface of a predetermined radius, or an elliptically curved surface.

Figure 7:
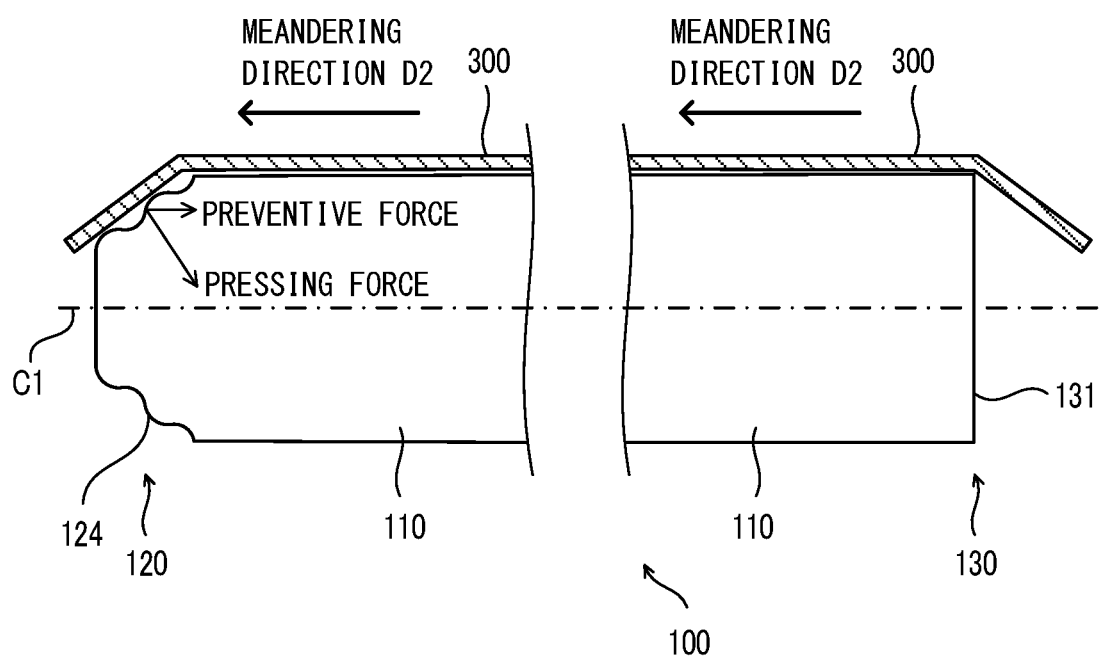
FIG. 7 is an enlarged diagram showing another configuration of the roller end portions in the belt driving device according to the embodiment of the present disclosure.

In addition, as shown in FIG. 7, the first end portion 120 may include an uneven surface 124 (contact surface) along which the roller diameter gradually decreases in the meandering direction D2. The uneven surface 124 may be curved or stepped. With this configuration, it is possible to increase the contact area of the first end portion 120 with the endless belt 300.

It is noted that the second end portion 130 may include a curved surface or an uneven surface (non-contact surface) on the condition that it does not come in contact with the right end portion of the endless belt 300.

In the above description, only the driving roller 100 has been explained, but not the driven roller 200. The driven roller 200 has the same configuration as the driving roller 100. That is, a first end portion 220 (see FIG. 2) of the driven roller 200 includes the inclined surface 121 (see FIG. 3), the curved surface 122 (see FIG. 5), the concave curved surface 123 (see FIG. 6), or the uneven surface 124 (see FIG. 7). In addition, a second end portion 230 (see FIG. 2) of the driven roller 200 includes the right-angle surface 131 (see FIG. 3) or the inclined surface 132 (see FIG. 4).

The belt driving device of the present disclosure is not limited to the above-described configurations. For example, the belt driving device 1 may include a plurality of rollers including the driving roller 100 and the driven roller 200. In addition, a first end portion of at least one roller of the plurality of rollers, which is located on the meandering direction side of the endless belt 300, may include the inclined surface 121 (see FIG. 3), the curved surface 122 (see FIG. 5), the concave curved surface 123 (see FIG. 6), or the uneven surface 124 (see FIG. 7).

As described above, the belt driving device of the present disclosure includes: a contact surface (an inclined surface, a curved surface, an uneven surface or the like) that is formed at a first end portion of at least one roller of a plurality of rollers, which is located on the meandering direction side of the endless belt 300, and is in contact with the endless belt 300; and a non-contact surface (a right-angle surface or the like) that is formed at a second end portion that is located on an opposite side to the meandering direction of the endless belt 300, and does not come in contact with the endless belt 300.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A belt driving device comprising:
a plurality of rollers including a driving roller that is rotationally driven;
an endless belt stretched between the plurality of rollers such that a predetermined tension is applied to the endless belt, and the endless belt protrudes from opposite end portions of the plurality of rollers in an axis direction of each of the plurality of rollers;
a contact surface formed at a first end portion of at least one roller of the plurality of rollers and configured to come in contact with the endless belt, the first end portion being located on a meandering direction side of the endless belt; and
a non-contact surface formed at each of second end portions of the plurality of rollers and configured not to come in contact with the endless belt, the second end portions being located on a side opposite to the meandering direction of the endless belt, wherein
the contact surface is a curved surface that is curved in the meandering direction.

2. The belt driving device according to claim 1, wherein alignment of the plurality of rollers is adjusted in advance such that the endless belt meanders toward a first end portion side as the driving roller is rotationally driven.

3. The belt driving device according to claim 1, wherein the contact surface resolves a force that is applied to the contact surface by the endless belt, into component forces including a component force in the opposite direction of the meandering direction, and the component force in the opposite direction of the meandering direction prevents meandering of the endless belt in the meandering direction.

4. The belt driving device according to claim 1, wherein the endless belt is an elastic belt.

5. The belt driving device according to claim 1, wherein the endless belt is an intermediate transfer belt from which a toner image is transferred to an image carrier, or a sheet conveyance belt configured to convey a sheet.

6. An image forming apparatus comprising:
the belt driving device according to claim 1; and
a transfer portion configured to transfer a toner image formed on a photoconductor to the endless belt, or to a sheet conveyed by the endless belt.

7. A belt driving device comprising:
a plurality of rollers including a driving roller that is rotationally driven;
an endless belt stretched between the plurality of rollers such that a predetermined tension is applied to the endless belt, and the endless belt protrudes from opposite end portions of the plurality of rollers in an axis direction of each of the plurality of rollers;
a contact surface formed at a first end portion of at least one roller of the plurality of rollers and configured to come in contact with the endless belt, the first end portion being located on a meandering direction side of the endless belt; and
a non-contact surface formed at each of second end portions of the plurality of rollers and configured not to come in contact with the endless belt, the second end portions being located on a side opposite to the meandering direction of the endless belt, wherein
the contact surface is an uneven surface along which the roller diameter gradually decreases in the meandering direction.

8. The belt driving device according to claim 7, wherein alignment of the plurality of rollers is adjusted in advance such that the endless belt meanders toward a first end portion side as the driving roller is rotationally driven.

9. The belt driving device according to claim 7, wherein the contact surface resolves a force that is applied to the contact surface by the endless belt, into component forces including a component force in a opposite direction of the meandering direction, and the component force in the opposite direction of the meandering direction prevents meandering of the endless belt in the meandering direction.

10. The belt driving device according to claim 7, wherein the endless belt is an elastic belt.

11. The belt driving device according to claim 7, wherein the endless belt is an intermediate transfer belt from which a toner image is transferred to an image carrier, or a sheet conveyance belt configured to convey a sheet.

12. An image forming apparatus comprising:
the belt driving device according to claim 7; and
a transfer portion configured to transfer a toner image formed on a photoconductor to the endless belt, or to a sheet conveyed by the endless belt.

* * * * *